(12) United States Patent
Haletky

(10) Patent No.: US 11,249,787 B2
(45) Date of Patent: Feb. 15, 2022

(54) METHOD AND SYSTEM FOR DATA COLLECTION USING HYPERVISOR

(71) Applicant: Bank of America Corporation, Charlotte, NC (US)

(72) Inventor: Edward L. Haletky, Austin, TX (US)

(73) Assignee: Bank of America Corporation, Charlotte, NC (US)

( * ) Notice: Subject to any disclaimer, the term of this patent is extended or adjusted under 35 U.S.C. 154(b) by 123 days.

(21) Appl. No.: 16/589,256

(22) Filed: Oct. 1, 2019

(65) Prior Publication Data

US 2021/0096900 A1 Apr. 1, 2021

(51) Int. Cl.
*G06F 9/455* (2018.01)
*G06N 20/00* (2019.01)

(52) U.S. Cl.
CPC ......... *G06F 9/45558* (2013.01); *G06N 20/00* (2019.01); *G06F 9/45541* (2013.01); *G06F 2009/4557* (2013.01); *G06F 2009/45579* (2013.01); *G06F 2009/45587* (2013.01)

(58) Field of Classification Search
CPC ....... G06F 9/45558; G06F 2009/45579; G06F 2009/45587; G06F 2009/4557; G06N 20/00
See application file for complete search history.

(56) References Cited

U.S. PATENT DOCUMENTS

| | | | |
|---|---|---|---|
| 8,156,298 B1 | 4/2012 | Stubblefield | |
| 8,171,108 B2 | 5/2012 | Shannon et al. | |
| 8,458,805 B2 | 6/2013 | Adelstein et al. | |
| 9,721,089 B2 | 8/2017 | Krishnan et al. | |
| 9,736,179 B2 | 8/2017 | Ismael | |
| 9,851,998 B2 | 12/2017 | Cochran | |
| 9,887,886 B2 | 2/2018 | Rahaman | |
| 9,922,192 B1 | 3/2018 | Kashyap et al. | |
| 10,067,787 B2 | 9/2018 | Bronner et al. | |
| 10,148,675 B1 | 12/2018 | Brandwine et al. | |
| 10,169,071 B2 | 1/2019 | Cochran | |
| 2011/0107331 A1* | 5/2011 | Evans | H04W 4/60 718/1 |
| 2012/0254861 A1* | 10/2012 | Down, Jr | G06F 8/63 718/1 |
| 2012/0323853 A1* | 12/2012 | Fries | G06F 11/3072 707/649 |
| 2014/0317681 A1 | 10/2014 | Shende | |
| 2016/0034295 A1* | 2/2016 | Cochran | G06F 9/5077 718/1 |
| 2017/0180318 A1* | 6/2017 | Lu | G06F 9/542 |
| 2018/0145888 A1 | 5/2018 | Rahaman | |
| 2019/0044966 A1 | 2/2019 | Vega et al. | |
| 2020/0341659 A1* | 10/2020 | Chauhan | G06F 3/067 |
| 2021/0049031 A1* | 2/2021 | Halcrow | G06F 21/53 |

* cited by examiner

*Primary Examiner* — Dong U Kim

(74) *Attorney, Agent, or Firm* — Banner & Witcoff, Ltd.

(57) ABSTRACT

Methods, systems, and computing platforms for data collection are disclosed. The system may include one or more hardware and virtual processors configured by machine-readable instructions. The processor(s) may be configured to electronically launch at least one virtual machine operatively connected to a virtualization layer. The processor(s) may be configured to electronically create a virtual disk for the at least one virtual machine connected to the virtualization layer so as to receive a plurality of artifact data.

9 Claims, 14 Drawing Sheets

METHOD AND SYSTEM FOR DATA COLLECTION USING HYPERVISOR

FIELD OF THE DISCLOSURE

The present disclosure relates to methods, systems, and computing platforms for forensic data collection using a hypervisor.

BACKGROUND

Cloud computing is becoming increasingly popular. In cloud computing, a cloud may be an aggregation of resources provisioned on demand. Cloud computing may involve cloud resources performing computations instead of, or in addition to, a user's computer. Cloud computing has been compared to a utility, where computing is the service being provided. Numerous consumers use the Internet, among things to purchase products on-line, locate special events, or read news stories. Numerous business establishments are connected to the Internet to provide products and services to the consumer or perform business-to-business electronic commerce. E-commerce and Internet applications operate and transmit data over a world-wide interconnected communications network.

Over time, data and information has accumulated in virtual computing environments as virtual computing has been adopted in more and more industries. The growing inventory of virtual machines, and the emergence of software-defined data centers (e.g., virtual data centers), the task of ensuring compliance with various regulations and standards has become daunting. Further, given budget and other constraints, organizations must manage larger, more complex environments with the same or fewer information technology (IT) maintenance and management resources. Such stretching of resources makes compliance an even greater challenge. As the quantity of stored data has exploded in the virtualization era, internal data configuration analysis has become time-consuming and often requires multiple tools.

SUMMARY

In light of the foregoing background, the following presents a simplified summary of the present disclosure in order to provide a basic understanding of some aspects of the disclosure. This summary is not an extensive overview of the disclosure. It is not intended to identify key or critical elements of the disclosure or to delineate the scope of the disclosure. The following summary merely presents some concepts of the disclosure in a simplified form as a prelude to the more detailed description provided below.

One aspect of the present disclosure relates to a system and method configured for data collection in a virtualization computing environment. The system may include one or more hardware and virtual processors configured by machine-readable instructions. In some implementations of the system and method, the processor(s) may be configured to electronically launch at least one virtual machine operatively connected to a virtualization layer. The processor(s) may be configured to electronically convert a stateless virtual machine to a persistent virtual machine and quarantine the virtual machine into a quarantine network. The processor(s) may be configured to electronically capture a plurality of digital memory attribute artifact data of a virtual disk of the persistent at least one virtual machine connected to the virtualization layer. The processor(s) may be configured to electronically capture digital content of a console associated with the at least one virtual machine so as to receive a plurality of console activity attribute artifact data. The processor(s) may be configured to electronically capture the digital packet data from a fault tolerant network so as to receive a plurality of CPU attribute artifact data. The processor(s) may be configured to electronically capture the memory attribute artifact data, the console activity attribute artifact data, and the CPU attribute artifact data into an immutable storage.

In some implementations of the system and method, the processor(s) may be configured to capture a plurality of digital log attribute artifact data based on a threshold period of time from the at least one virtual machine connected to the virtualization layer.

In some implementations of the system and method, the processor(s) may be configured to electronically process the memory attribute artifact data, console activity attribute artifact data, and CPU attribute artifact data with a machine learning appliance so as to output a forensic attribute data set for the at least one virtual machine.

In some implementations of the system and method, the processor(s) may be configured to capture a plurality of digital log attribute artifact data from the at least one virtual machine connected to the virtualization layer.

In yet some implementations of the system and method, the processor(s) may be configured to electronically launch at least one virtual machine operatively connected to a virtualization layer. The processor(s) may be configured to electronically convert a stateless virtual machine to a persistent virtual machine and quarantine the virtual machine into a quarantine network. The processor(s) may be configured to electronically capture a virtual disk for the virtual machine connected to the virtualization layer so as to receive a plurality of memory attribute artifact data. The processor(s) may be configured to electronically capture digital content of a console associated with the at least one virtual machine so as to receive a plurality of console activity attribute artifact data. The processor(s) may be configured to electronically capture the digital packet data from a fault tolerant network so as to receive a plurality of CPU attribute artifact data. The processor(s) may be configured to electronically capture the memory attribute artifact data, the console activity attribute artifact data, and the CPU attribute artifact data into an immutable storage.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

DETAILED DESCRIPTION

In the following description of the various embodiments, reference is made to the accompanying drawings, which form a part hereof, and in which is shown by way of illustration, various embodiments in which the disclosure may be practiced. It is to be understood that other embodiments may be utilized and structural and functional modifications may be made.

Figure 1:
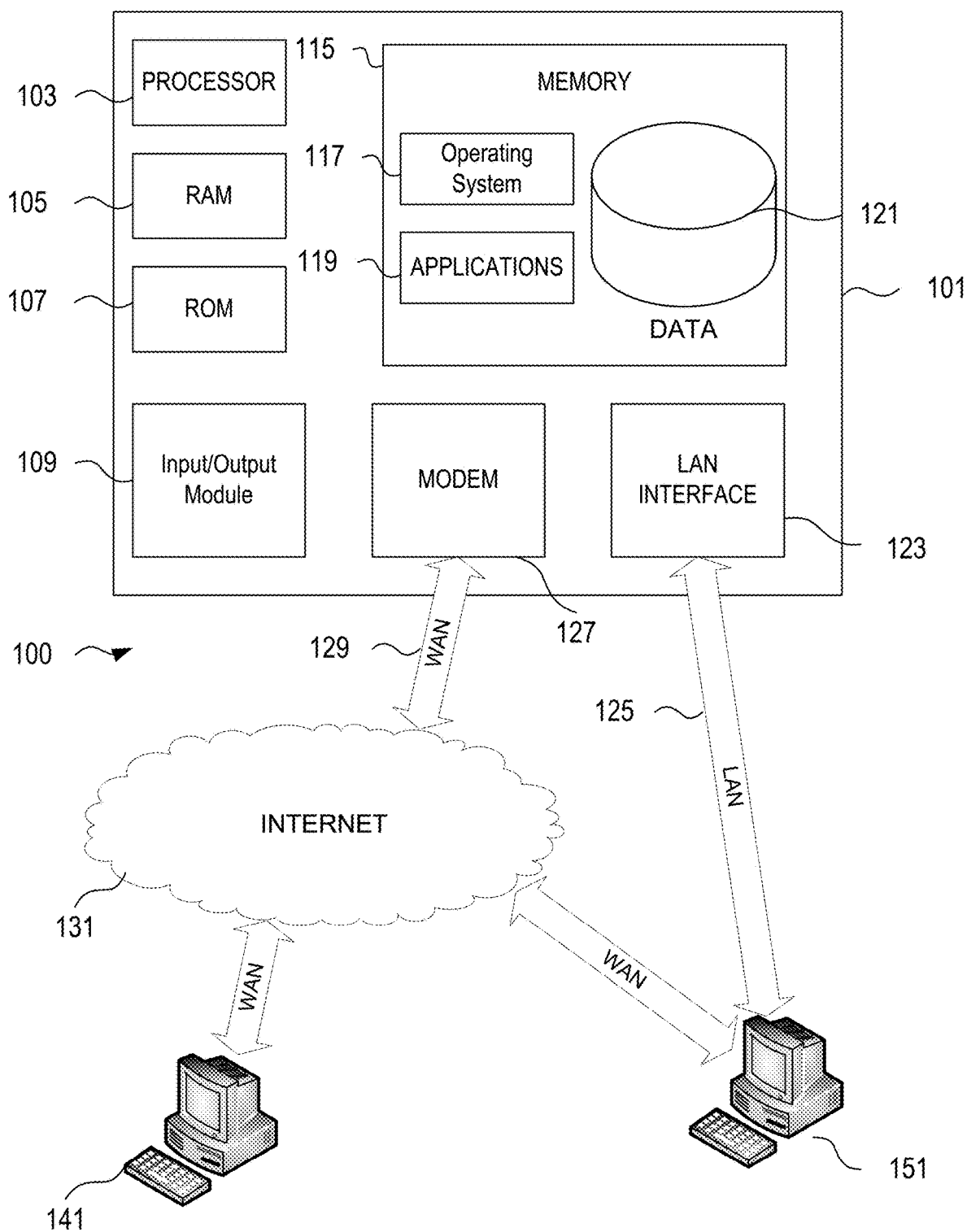
FIG. 1 illustrates a schematic diagram of a digital computing environment in which certain aspects of the present disclosure may be implemented.

FIG. 1 illustrates a block diagram of a specific programmed computing device 101 (e.g., a computer server) that may be used according to an illustrative embodiment of the disclosure. The computer server 101 may have a processor 103 for controlling overall operation of the server and its associated components, including RAM 105, ROM 107, input/output module 109, and memory 115.

Input/Output (I/O) 109 may include a microphone, keypad, touch screen, camera, and/or stylus through which a user of device 101 may provide input, and may also include one or more of a speaker for providing audio output and a video display device for providing textual, audiovisual and/or graphical output. Other I/O devices through which a user and/or other device may provide input to device 101 also may be included. Software may be stored within memory 115 and/or storage to provide computer readable instructions to processor 103 for enabling server 101 to perform various technologic functions. For example, memory 115 may store software used by the server 101, such as an operating system 117, application programs 119, and an associated database 121. Alternatively, some or all of server 101 computer executable instructions may be embodied in hardware or firmware (not shown). As described in detail below, the database 121 may provide centralized storage of characteristics associated with vendors and patrons, allowing functional interoperability between different elements located at multiple physical locations.

The server 101 may operate in a networked environment supporting connections to one or more remote computers, such as terminals 141 and 151. The terminals 141 and 151 may be personal computers or servers that include many or all of the elements described above relative to the server 101. The network connections depicted in FIG. 1 include a local area network (LAN) 125 and a wide area network (WAN) 129, but may also include other networks. When used in a LAN networking environment, the computer 101 is connected to the LAN 125 through a network interface or adapter 123. When used in a WAN networking environment, the server 101 may include a modem 127 or other means for establishing communications over the WAN 129, such as the Internet 131. It will be appreciated that the network connections shown are illustrative and other means of establishing a communications link between the computers may be used. The existence of any of various protocols such as TCP/IP, Ethernet, FTP, HTTP and the like is presumed.

Computing device 101 and/or terminals 141 or 151 may also be mobile terminals including various other components, such as a battery, speaker, and antennas (not shown).

The disclosure is operational with numerous other general purpose or special purpose computing system environments or configurations. Examples of computing systems, environments, and/or configurations that may be suitable for use with the disclosure include, but are not limited to, personal computers, server computers, handheld or laptop devices, multiprocessor systems, microprocessor-based systems, set top boxes, programmable consumer electronics, network PCs, minicomputers, mainframe computers, mobile computing devices, e.g., smart phones, wearable computing devices, tablets, distributed computing environments that include any of the above systems or devices, and the like.

The disclosure may be described in the context of computer-executable instructions, such as program modules, being executed by a computer. Generally, program modules include routines, programs, objects, components, data structures, etc. that perform particular tasks or implement particular computer data types. The disclosure may also be practiced in distributed computing environments where tasks are performed by remote processing devices that are linked through a communications network. In a distributed computing environment, program modules may be located in both local and remote computer storage media including memory storage devices.

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be one or more self-consistent procedures or instructions leading to a desired result. The procedures are those requiring physical manipulations of physical quantities. Usually, although not necessarily, these quantities take the form of electrical or magnetic signals capable of being stored, transferred, combined, compared, and otherwise manipulated in an electronic device.

It should be borne in mind, however, that all of these and similar terms are to be associated with the appropriate physical quantities and are merely convenient labels applied to these quantities. Unless specifically stated otherwise as apparent from the following discussions, it is appreciated that throughout the description of the constructions, discussions utilizing terms such as "connecting," "displaying," "receiving," "providing," "determining," "generating," "establishing," "managing," "extending," "creating," "migrating," "effectuating," or the like, refer to the actions and processes of an electronic computing device or system such as: a host processor, a processor, a memory, a virtual storage area network (VSAN), a virtualization management server or a virtual machine (VM), among others, of a virtualization infrastructure or a computer system of a distributed computing system, or the like, or a combination thereof. It should be appreciated that the virtualization infrastructure may be on-premises (e.g., local) or off-premises (e.g., remote or cloud-based), or a combination thereof. The electronic device manipulates and transforms data represented as physical (electronic and/or magnetic) quantities within the electronic device's registers and memories into other data similarly represented as physical quantities within the electronic device's memories or registers or other such information storage, transmission, processing, or display components. It is appreciated that throughout the description of the constructions, a virtual machine identifier may include a unique name or metadata associated with a VM (e.g., tag, label, name, universally unique identifier (uuid), mac address, etc.)

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Figure 2:
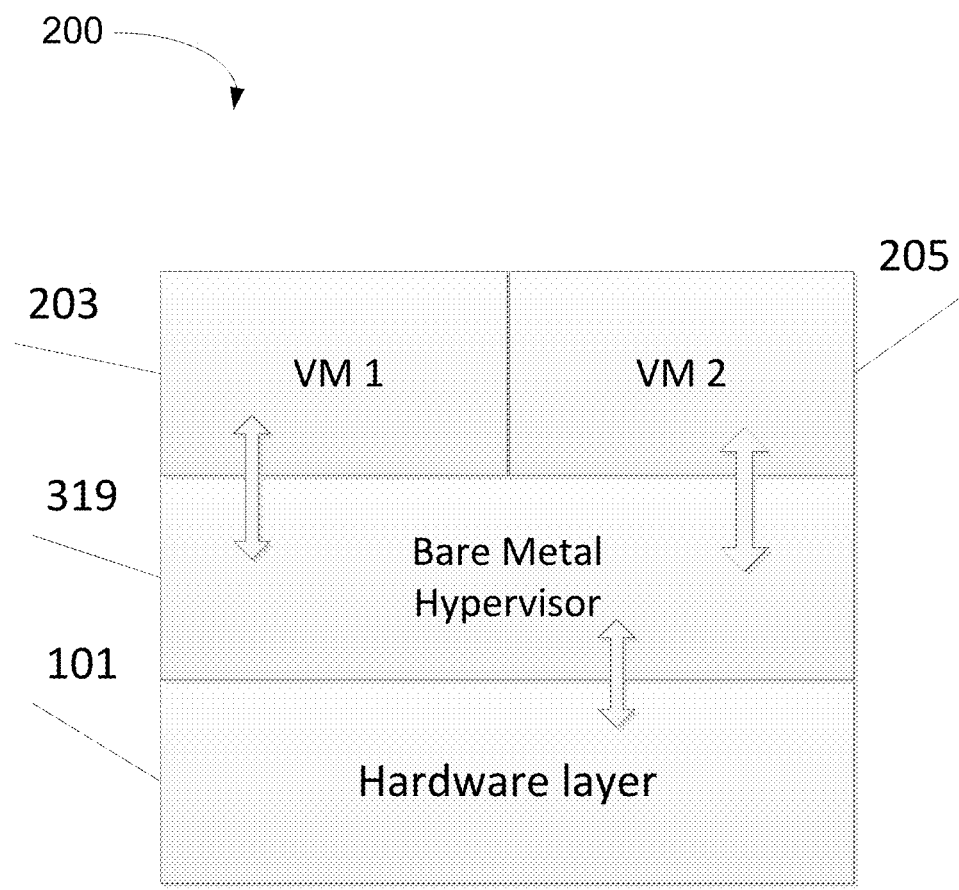
FIG. 2 is an illustrative block diagram of a virtualization computing environment that may be used to implement the processes and functions of certain embodiments of the present disclosure.

Referring to FIG. 2, a virtualization platform 319 (sometimes referred to as a "virtualization layer," a "hypervisor" or a "virtual machine monitor") abstracts processor, memory, storage and/or other resources of the processor into one or more virtual machines, such as VM 203 and VM 205. The bare-metal or Type-I hypervisor 319 communicates directly with the computer hardware acting as a physical hardware host. A virtual machine is an emulation of a particular computer system. With the development of virtual machine technology, a virtual desktop environment is spreading more and more. However, since data exists only on the server, data information can be lost.

A virtual desktop infrastructure (hereinafter also referred to as "VDI") is realized by, for example, VMware Horizon View, Citrix XenDesktop, and Windows Server ("VMware" is a registered trademark of VMware Inc. in the United States, other countries, or both; "Xen" is a registered trademark of Citrix Systems, Inc. in the United States, other countries, or both; and "Windows" is a registered trademark of Microsoft Corporation in the United States, other countries, or both). While the following description refers to VMware vSphere, VMware vCenter and VMware Horizon View, in particular, the implementations described herein enables distributed computing clusters using any distributed computing platform and any virtualization platform.

Figure 3:
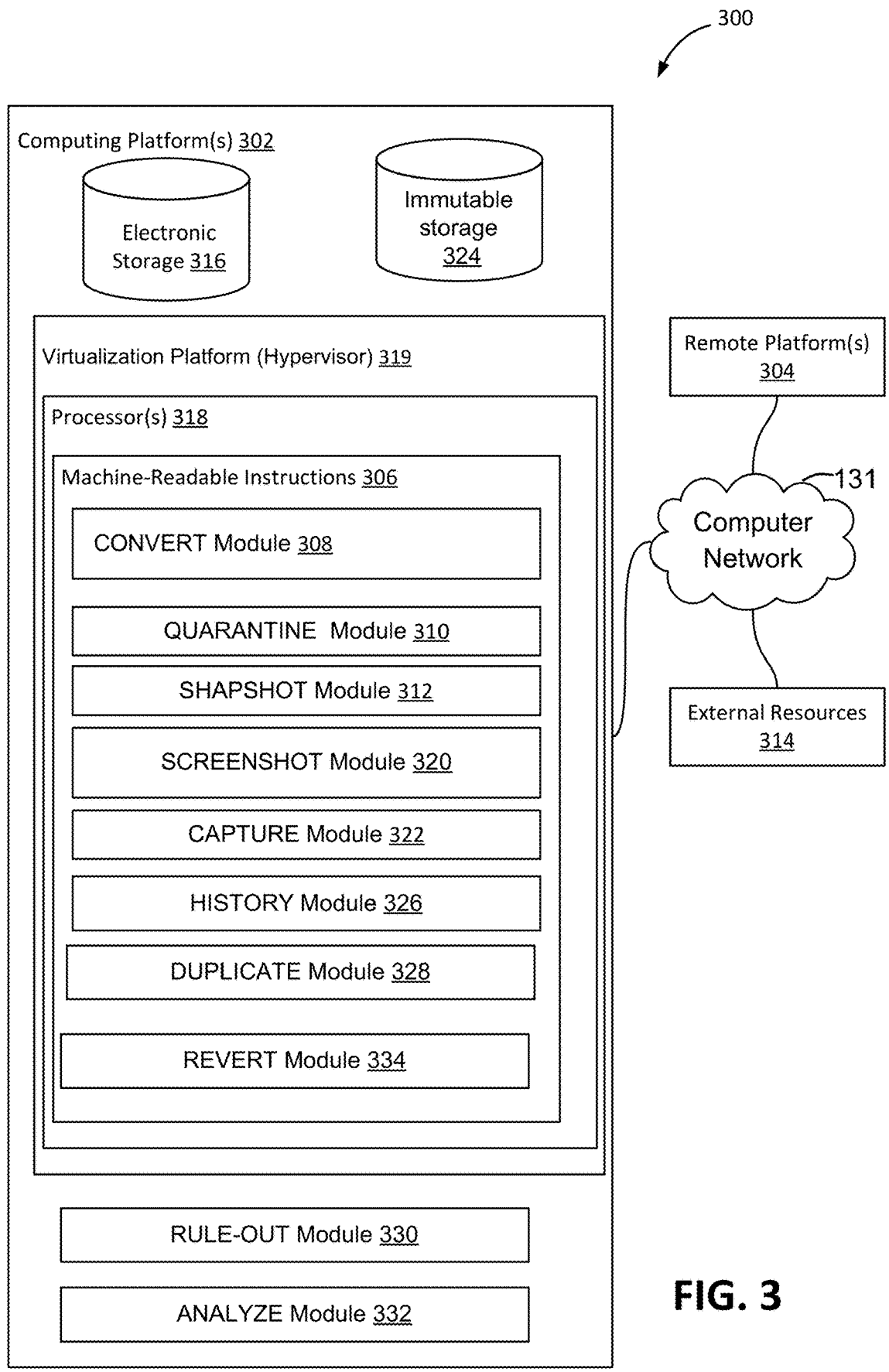
FIG. 3 illustrates a system configured for data collection in a virtualization computing environment, in accordance with one or more implementations.

FIG. 3 illustrates a system 300 configured for data collection, in accordance with one or more implementations. In some implementations, system 300 may include one or more computing platforms 302. Computing platform(s) 302 may be configured to communicate with one or more remote platforms 304 according to a client/server architecture, a peer-to-peer architecture, and/or other architectures. Remote platform(s) 304 may be configured to communicate with other remote platforms via computing platform(s) 302 and/or according to a client/server architecture, a peer-to-peer architecture, and/or other architectures. Users may access system 300 via remote platform(s) 304.

Computing platform(s) 302 may be configured by machine-readable instructions 306. Machine-readable instructions 306 may include one or more instruction modules. The instruction modules may include computer program modules on the virtualization platform. The instruction modules may include one or more of a Convert Module 308, Quarantine Module 310, Shapshot Module 312, Screenshot module 320, Capture Module 322, History Module 326, Duplicate Module 328, Rule-Out Module 330, Analyze Module 332, Revert Module 334 and/or other instruction modules.

In some implementations, system 300 enables for the collection of forensic artifacts for any virtual machine running without limitations based on the type of the virtual machine (stateless or persistent), the operating system, or deployment model (appliance or automated build). The process disclosed herein enables the collection of network, user activity, console activity, memory, CPU, historical, and disk artifacts. The system 300 allows enables duplication of those artifacts and storage of those artifacts in a repeatable automated process. The computer readable database 316 and storage 324 may include the "attribute data" including ASCII characters in computer machine readable form or binary complied data. The ASCII characters or binary data can be manipulated in the software of system 300.

Still referring to FIG. 3, in an example, hypervisor 319 abstracts processor, memory, storage and/or other resources of the processor(s) 318 into one or more virtual machines, such as VM 203 and VM 205. Concurrently, the hypervisor 319 also launches, transparently to the user, modules 308, 310, 312, 320, 322, 326, 328, 330, 332, and 334, ad-hoc or scheduled operations depending on program parameters. In some implementations, the hypervisor 319 may employ modules 308, 310, 312, 320, 322, 326, 328, 330, and 332 and other modules to implement one or more of forensic data collection, forensic data dynamic capturing, forensic data preservation or forensic data analysis functions in a virtual processing environment. The scheduled operations can be over a threshold period of time could be a time for a day, such as increments of only two, four, or six hours, such morning, afternoon, evening. In some implementations, the threshold period of time could be for over several days, hours or weeks.

In some implementations, the hypervisor 319 mediates access to the computer 302 for the operating system 117 and VM 203 and VM 205. In one example, the hypervisor 319 includes an application programming interface (API) that can be abstracted as a virtual switch at the hypervisor level, such that it has full access to the virtual switch. In some implementations, modules 308, 310, 312, 320, 322, 326, 328, 330, 332 of hypervisor 319 connectivity to those virtual machines provide access to all the data in those virtual machines. In this manner, the hypervisor 319 via modules 308, 310, 312, 320, 322, 326, 328, 330, and 332 can inspect the data to the computer abstracted as node endpoints on the network. This construction enables the traffic from the user operating system VM to be directed the through the hypervisor 319 that comprises the virtual switch to get to the network cloud or other data. In this way, the hypervisor 319 can see data traffic in and out of the computer and going to the virtual machine.

Referring to FIG. 3, in some implementations, Convert Module 308 determines whether the target virtual machine 203 ("VM") is stateless or persistent. Convert module 308 provides machine-readable instructions to the virtualization desktop environment, either as a Citrix center stop, a VMware Horizon View, for example. If VM 203 is stateless, then the module 308 converts the VM to a persistent VM. Disk writes by the stateless VM issued by software running inside the VM appear to be written to the independent virtual disk. In the stateless model, the data is discarded after the virtual machine is powered off. While the stateless VM model presents opportunities, such as the ability to assign users to any available VM at the point of request, this stateless model has some hidden costs in the areas of operational complexity, application management and data loss.

Figure 5:
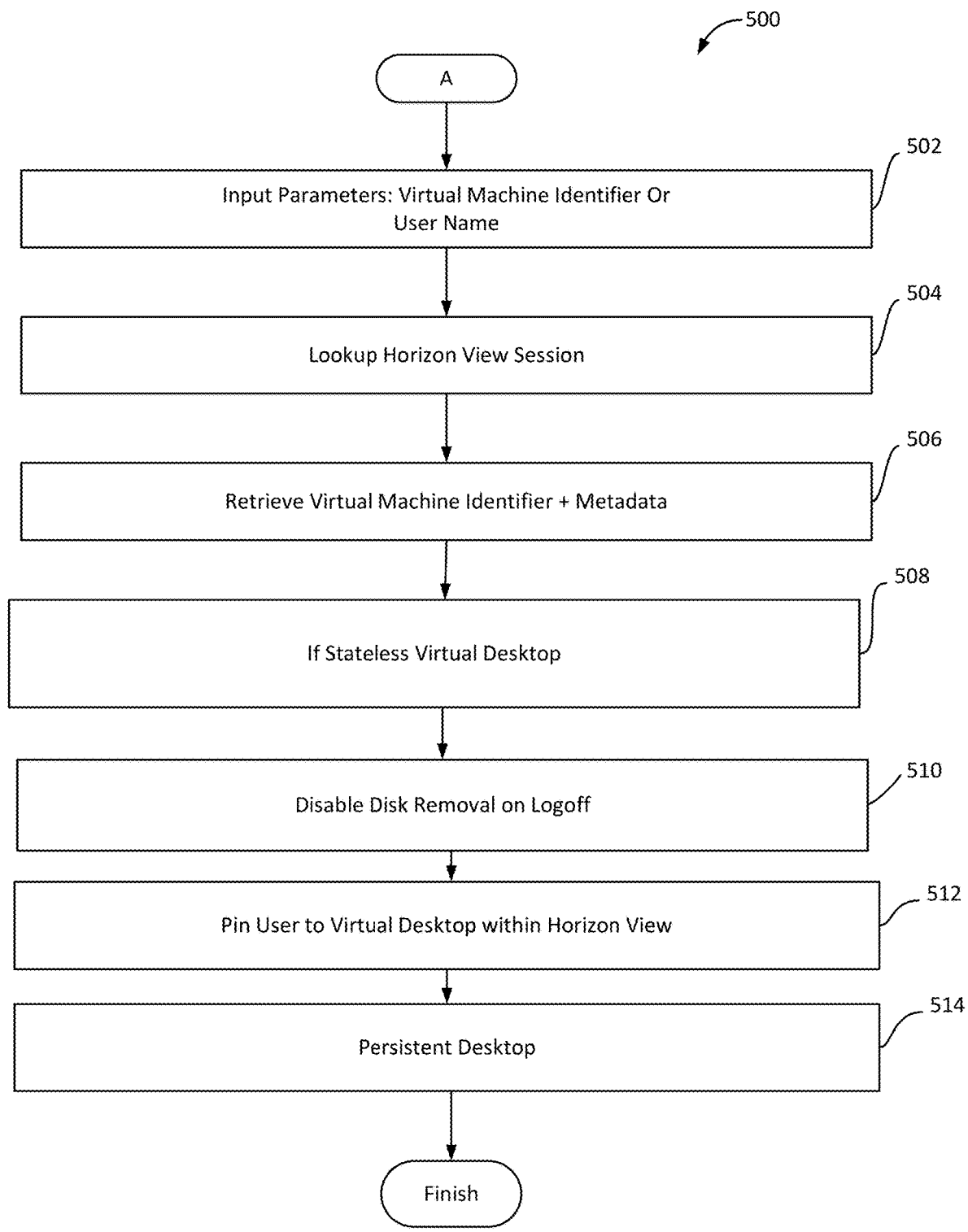
FIG. 5 illustrates a method for data collection in a virtualization environment, in accordance with one or more implementations.

Stateless virtual machines, run and when they are finished running, the stateless VM gets destroyed and then they get rebuilt and run again when the user logs in again. Thus, for stateless virtual machines, it presents a problem of data preservation, because once the VM is destroyed, data cannot be gathered from it. Thus, a stateless VM is not a VM that has its own local data. The data traffic and instructions of a stateless VM may be loss and not preserved. Further, a delay or breakdown of the network might result in loss of data. According to one implementation, the persistent VM model enables the data to be saved. In some implementations, for the target stateless VM there might be data that the information technology center desires to have for an active investigation that is data transparent to the user. Module 308 takes the stateless VM, converts it to a persistent VM, and then allows other modules to perform the state of gathering forensic data on a continual basis. And when a user or machine logs in again, the user gets to the same VM (persistent), instead of a new VM in the stateless configuration. Referring to FIG. 5, operation 500 illustrates one process of stateless VM to persistent VM conversion that may be performed by one or more hardware processors configured by machine-readable instructions including module that is the same as or similar to module 308 in accordance with one or more implementations.

Figure 6:
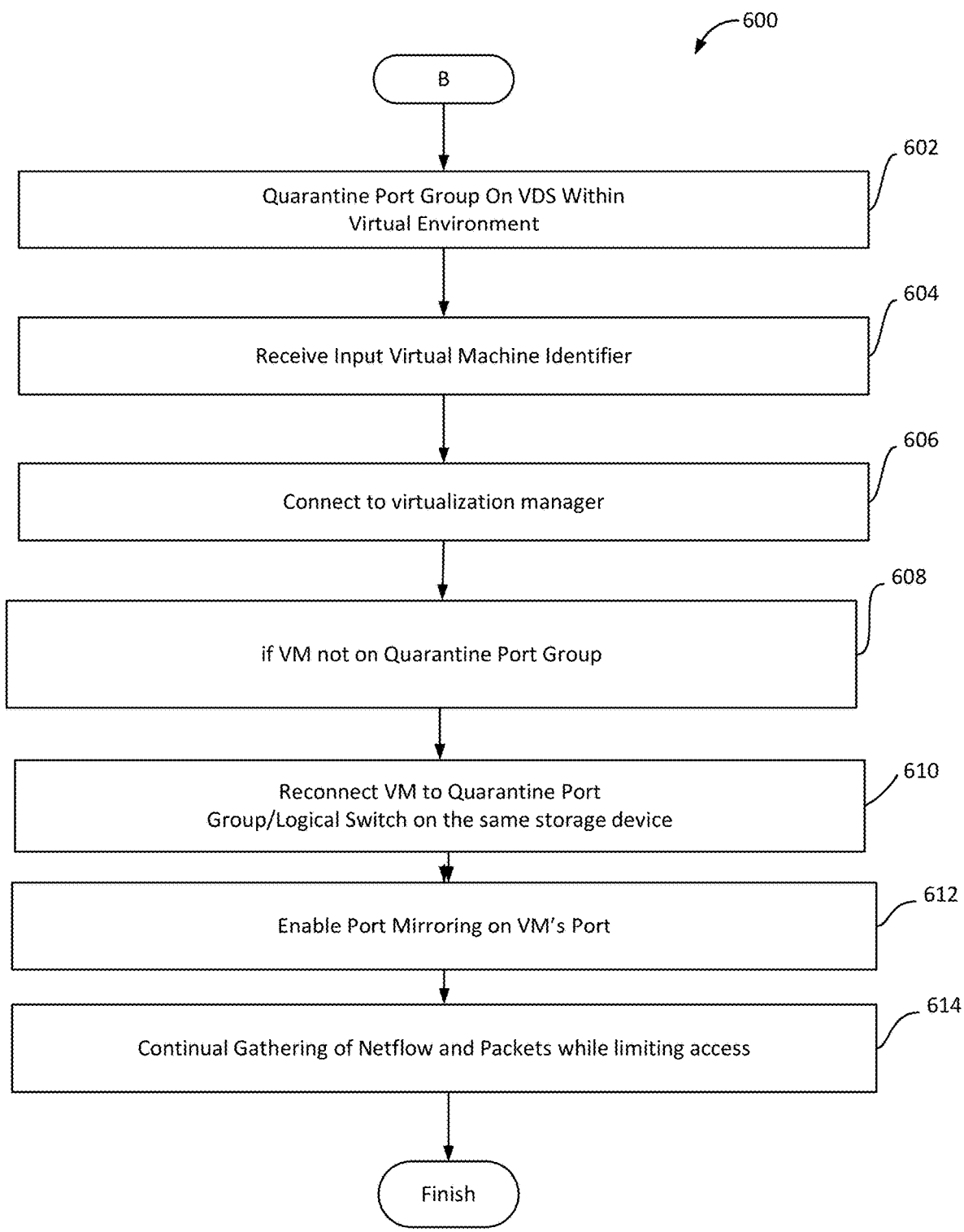
FIG. 6 illustrates a method for data collection in a virtualization environment, in accordance with one or more implementations.

Referring to FIG. 3, in some implementations, Quarantine Module 310 provides machine-readable instructions to the hypervisor 319 to move the persistent VM to a quarantine location on the network or to a quarantine network. This feature enables the gathering of network artifacts pertaining to the target VM 203. Referring to FIG. 6, operation 600 illustrates one process of quarantining a VM that may be performed by one or more hardware processors configured by machine-readable instructions including module that is the same as or similar to module 310 in accordance with one or more implementations.

Figure 7:
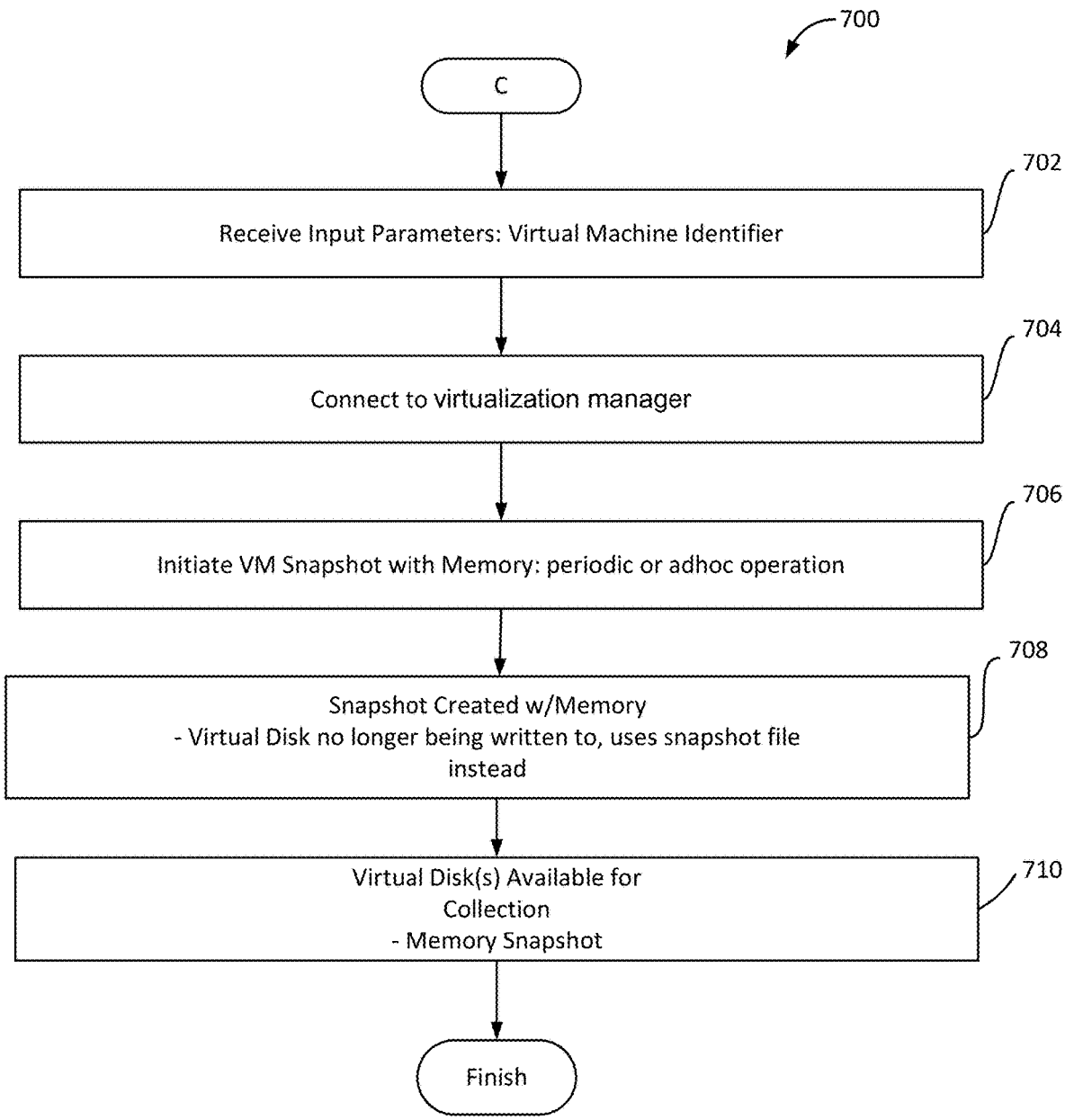
FIG. 7 illustrates a method for data collection in a virtualization environment, in accordance with one or more implementations.

Referring to FIG. 3, in some implementations, Shapshot Module 312 provides machine-readable instructions to the hypervisor 319 to capture the virtual disk with memory. Module 312 preserves the virtual machine at a specific moment in time at the state of the data on all the virtual machine's disks and whether the virtual machine was powered on, powered off or suspended. This feature enables the gathering of virtual disk and memory artifacts pertaining to the target VM 203. Referring to FIG. 7, operation 700 illustrates one process of that may be performed by one or more hardware processors configured by machine-readable instructions including module that is the same as or similar to module 312 in accordance with one or more implementations. In one implementation, the processor(s) may be configured to electronically capture a virtual disk for at least one virtual machine connected to the virtualization layer so as to receive a plurality of memory attribute artifact data.

Figure 8:
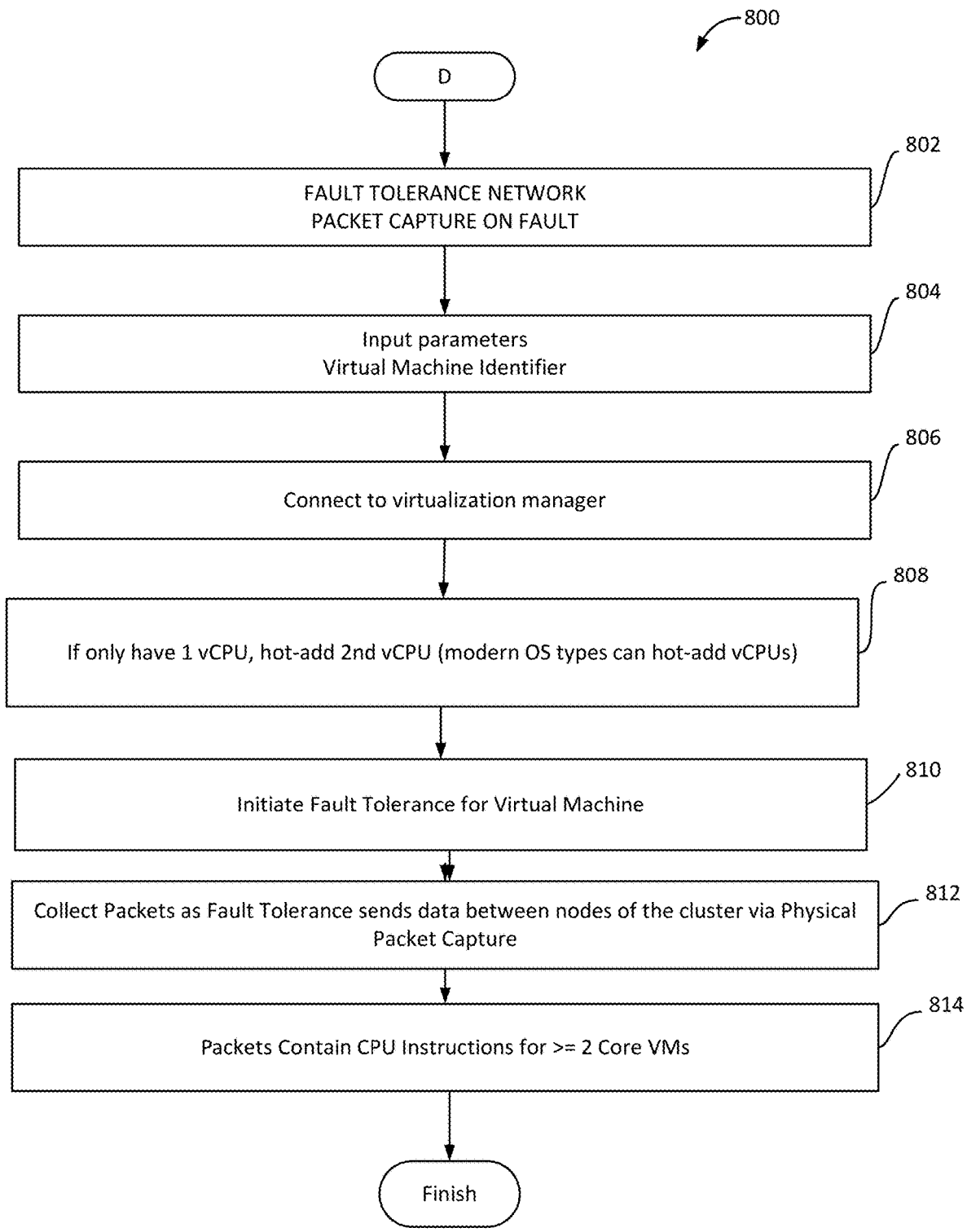
FIG. 8 illustrates a method for data collection in a virtualization environment, in accordance with one or more implementations.

In some implementations, Screenshot module 320 provides machine-readable instructions to hypervisor to a capture what is happened anywhere on the console. This feature enables the capturing of console activity artifacts and user activity artifacts pertaining to the target VM 203. Referring to FIG. 8, operation 800 illustrates one process that may be performed by one or more hardware processors configured by machine-readable instructions including module that is the same as or similar to module 320 in accordance with one or more implementations. In one implementation, the processor(s) may be configured to electronically capture digital content of a console associated with at least one virtual machine so as to receive a plurality of console activity attribute artifact data.

Figure 9:
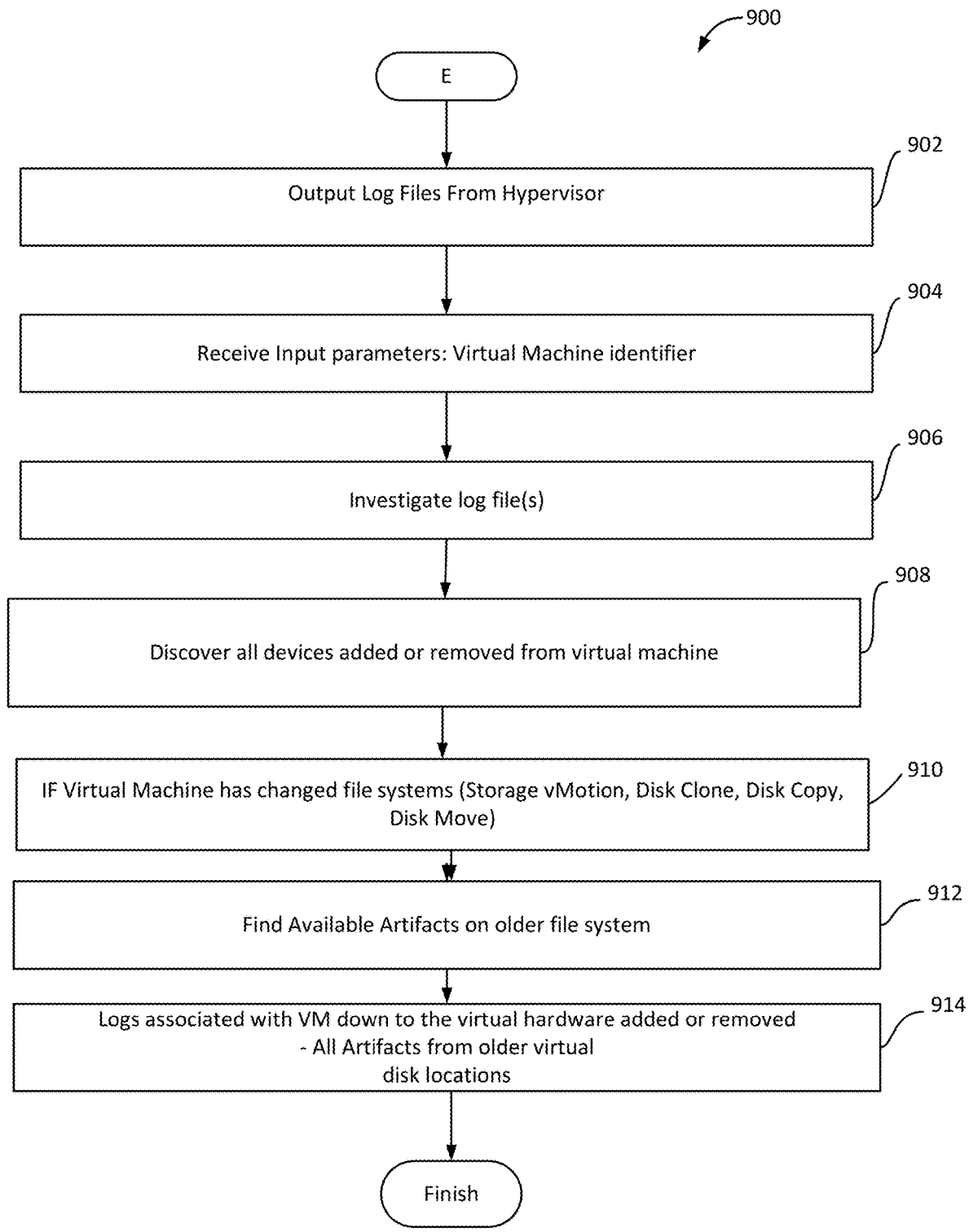
FIG. 9 illustrates a method for data collection in a virtualization environment, in accordance with one or more implementations.

Referring to FIG. 3, in some implementations, Capture Module 322 provides machine-readable instructions to set up fault tolerance so the system 300 can start capturing CPU instructions off the network 131. This module is making use of the fault tolerance mechanism of virtualization environment that sends packet instructions over a network. This feature enables capturing the CPU artifacts and data flows to and from virtual machine 203. Referring to FIG. 9, operation 900 illustrates one process that may be performed by one or more hardware processors configured by machine-readable instructions including module that is the same as or similar to module 322 in accordance with one or more implementations. In one implementation, the processor(s) may be configured to electronically capture the digital packet data from a fault tolerant network so as to receive a plurality of CPU attribute artifact data.

Figure 10:
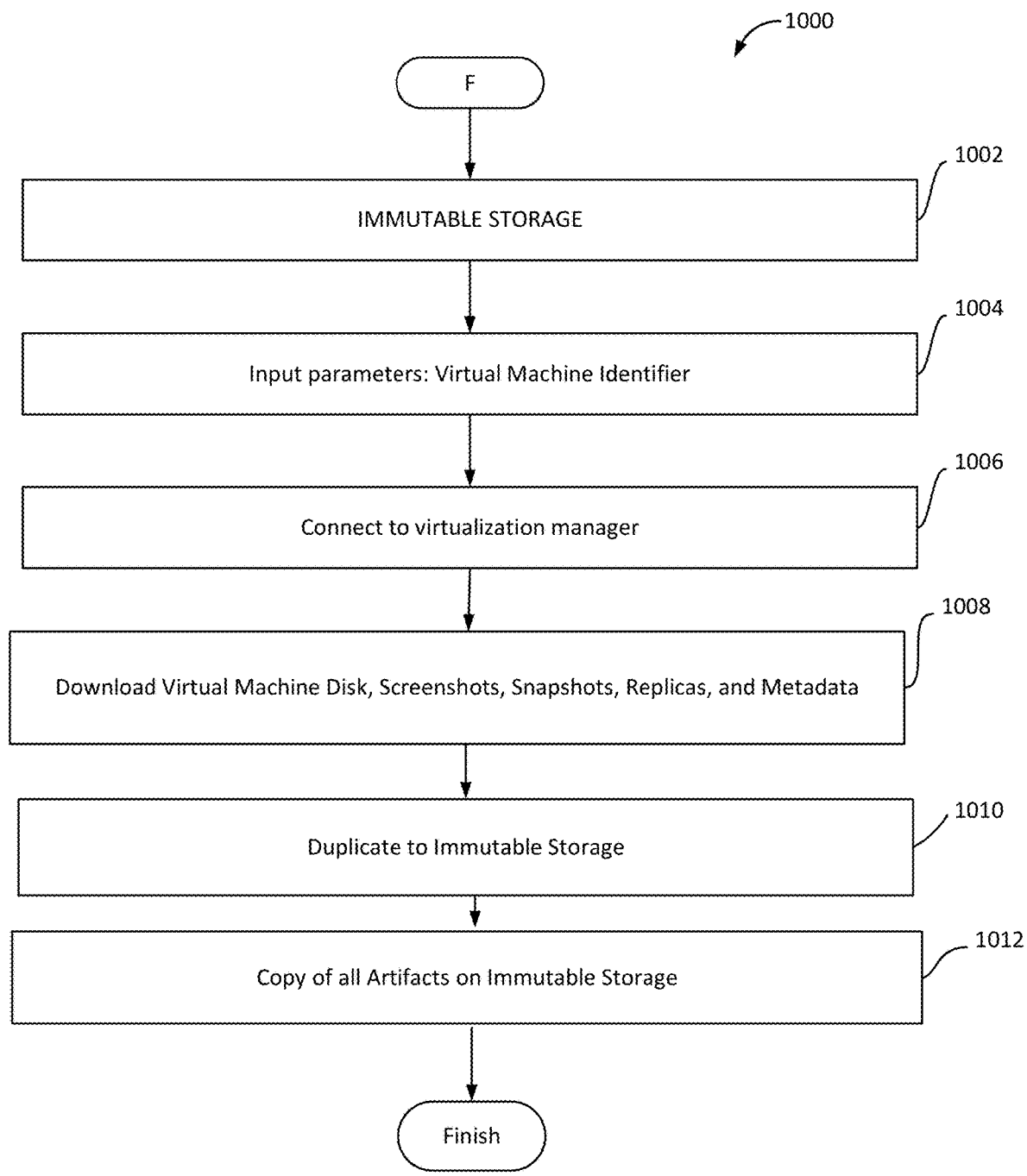
FIG. 10 illustrates a method for data collection in a virtualization environment, in accordance with one or more implementations.

Referring to FIG. 3, in some implementations, History Module 326 provides machine-readable instructions to the hypervisor 319 to obtain some or all the history, some or all the logs and so forth of the target VM. This feature enables the gathering of history activity artifacts pertaining to the target VM 203. Referring to FIG. 10, operation 1000 illustrates one that may be performed by one or more hardware processors configured by machine-readable instructions including module that is the same as or similar to module 326 in accordance with one or more implementations. In one implementation, the processor(s) may be configured to capture a plurality of digital log attribute artifact data based on a threshold period of time from at least one virtual machine connected to the virtualization layer.

Figure 11:
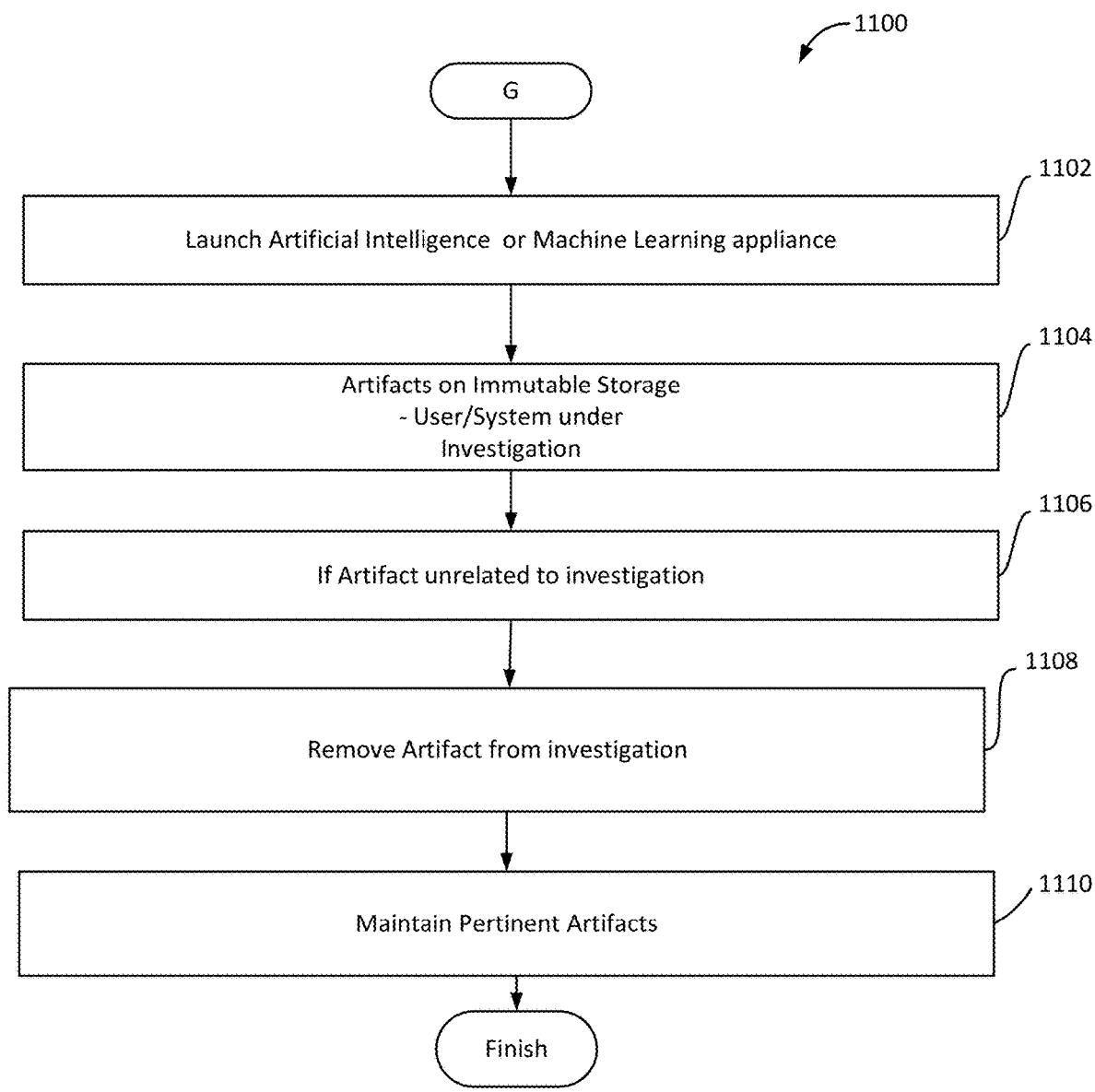
FIG. 11 illustrates a method for data collection in a virtualization environment, in accordance with one or more implementations.

Referring to FIG. 3, in some implementations, Duplicate Module 328 provides machine-readable instructions to the hypervisor 319 and download or capture that acquired data to an immutable storage 324. Examples of immutable storage 324 are non-transient computer-readable storage medium for non-erasable and non-rewritable storage or non-transitory digital data that preserve records and to maintain data integrity in a WORM (Write-Once-Read-Many), non-erasable and non-rewritable manner to protect against deletion or modification until the end of retention periods or other threshold periods. Referring to FIG. 11, operation 1100 illustrates one process that may be performed by one or more hardware processors configured by machine-readable instructions including module that is the same as or similar to module 328 in accordance with one or more implementations.

Figure 12:
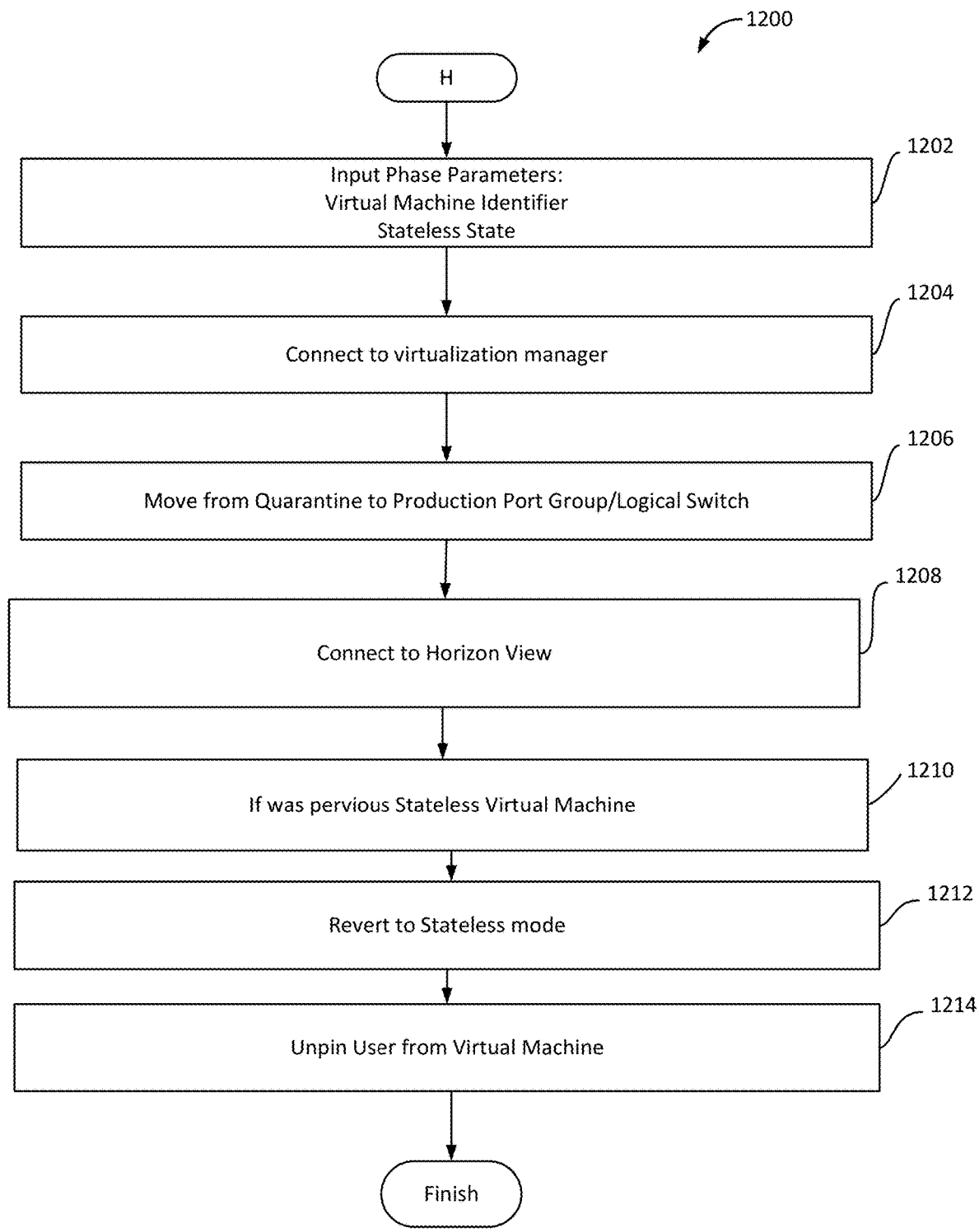
FIG. 12 illustrates a method for data collection in a virtualization environment, in accordance with one or more implementations.

In some implementations, Revert Module 334 provides machine-readable instructions to the virtual desktop environment to revert the persistent VM to a stateless VM, after the forensic analysis is performed. In some implementations, revert module 334 provides machine-readable instructions to the hypervisor 319 to remove target VM from the quarantine network. Referring to FIG. 12, operation 1200 illustrates one process that may be performed by one or more hardware processors configured by machine-readable instructions including module that is the same as or similar to module 334 in accordance with one or more implementations.

In some implementations, Rule-Out Module 330 can provide automated intelligent decision mechanics that may employ exemplary constructions described by referring to and/or using neural network(s) to determine if artifacts are unrelated in the active data investigation of target VM 203 so as to retain pertinent artifacts for forensic analysis. A machine learning appliance may be configured to electronically process with a machine deep learning controller, in one example. Various structural elements of neural network includes layers (input, output, and hidden layers), nodes (or cells) for each, and connections among the nodes. Each node is connected to other nodes and has a nodal value (or a weight) and each connection can also have a weight. The initial nodal values and connections can be random or uniform. A nodal value/weight can be negative, positive, small, large, or zero after a training session with training data set. System 300 may incorporate various machine intelligence (MI) neutral network 1400 (see FIG. 14) features of available TENSORFLOW (https://www.tensorflow.org), KERAS (a component of Tensorflow), or NEUROPH software development platforms (which are incorporated by reference herein).

Figure 14:
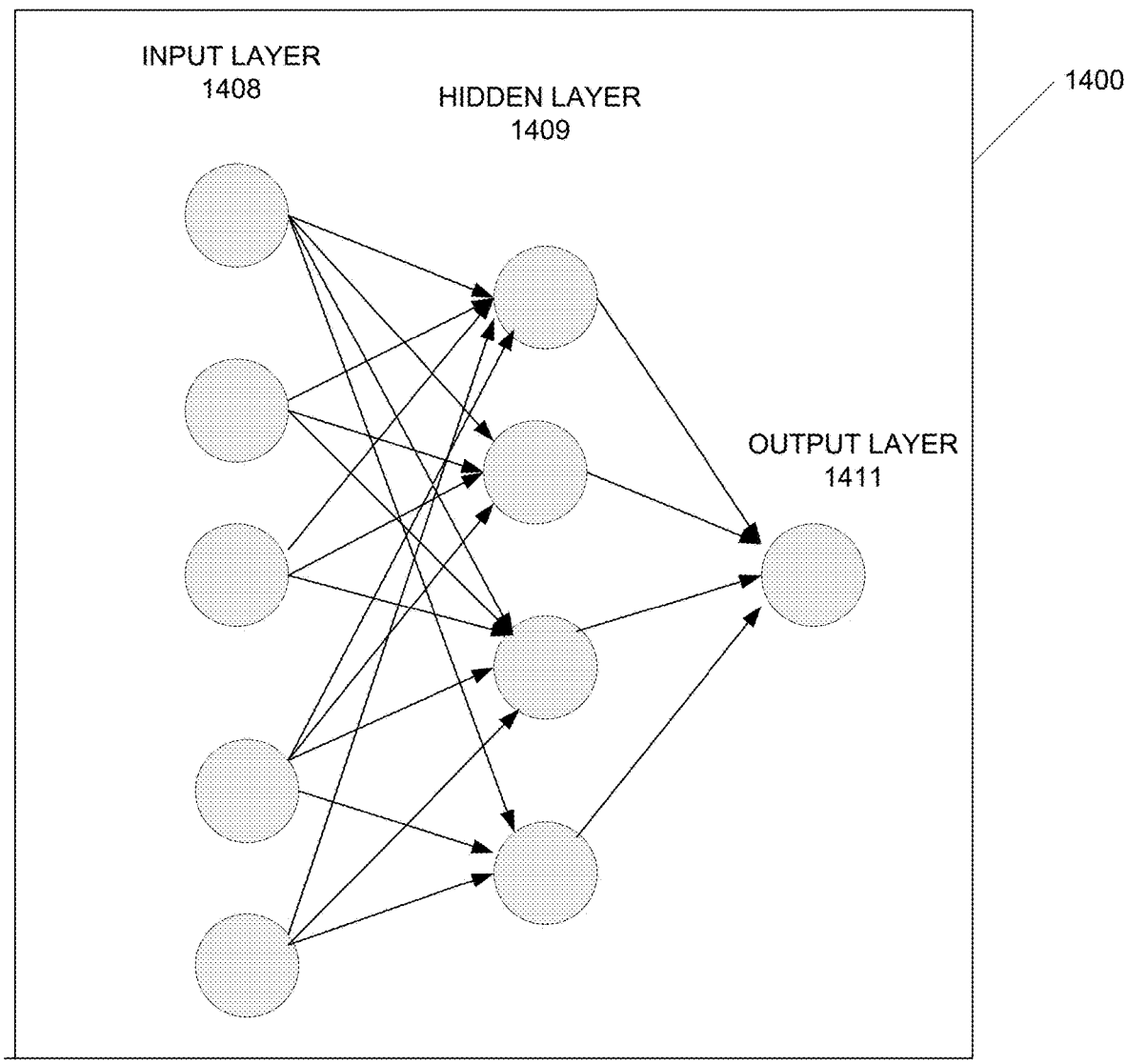
FIG. 14 is an illustrative functional block diagram of a neural network that may be used to implement the processes and functions, in accordance with one or more implementations.

Referring to FIG. 14, neural network 1400 is generally arranged in "layers" of node processing units serving as simulated neutrons, such that there is an input layer 1408, representing the input fields into the network. To provide the automated machine learning processing for a machine learning appliance, one or more hidden layers 1409 with machine learning rule sets processes the input data. An output layer 1411 provides the result of the processing of the network data. Operation 1300 illustrates one process that may be performed by one or more hardware processors configured by machine-readable instructions including module that is the same as or similar to module 330 in accordance with one or more implementations. The processor(s) may be configured to electronically process the memory attribute artifact data, user activity attribute artifact data, and CPU attribute artifact data with a machine learning appliance so as to output a forensic attribute data set for the at least one virtual machine.

In some implementations, Analyze Module 332 provides machine-readable instructions to perform forensic analysis on the collected data from the target virtual machine. In some implementations, computing platform(s) 302, remote platform(s) 304, and/or external resources 314 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which computing platform(s) 302, remote platform(s) 304, and/or external resources 314 may be operatively linked via some other communication media.

A given remote platform 304 may include one or more processors configured to execute computer program modules. The computer program modules may be configured to enable an expert or user associated with the given remote platform 304 to interface with system 300 and/or external resources 314, and/or provide other functionality attributed herein to remote platform(s) 304. By way of non-limiting example, a given remote platform 304 and/or a given computing platform 302 may include one or more of a server, a desktop computer, a laptop computer, a handheld computer, a tablet computing platform, a NetBook, a Smartphone, a gaming console, and/or other computing platforms.

External resources 314 may include sources of information outside of system 300, external entities participating with system 300, and/or other resources. In some implementations, some or all of the functionality attributed herein to external resources 314 may be provided by resources included in system 300.

Computing platform(s) 302 may include electronic storage 316, one or more processors 318, and/or other components. Computing platform(s) 302 may include communication lines, or ports to enable the exchange of information with a network and/or other computing platforms. Illustration of computing platform(s) 302 in FIG. 3 is not intended to be limiting. Computing platform(s) 302 may include a plurality of hardware, software, and/or firmware components operating together to provide the functionality attributed herein to computing platform(s) 302. For example, computing platform(s) 302 may be implemented by a cloud of computing platforms operating together as computing platform(s) 302.

Electronic storage 316 may comprise non-transitory storage media that electronically stores information. The electronic storage media of electronic storage 316 may include one or both of system storage that is provided integrally (i.e., substantially non-removable) with computing platform(s) 302 and/or removable storage that is removably connectable to computing platform(s) 302 via, for example, a port (e.g., a USB port, a firewire port, etc.) or a drive (e.g., a disk drive, etc.). Electronic storage 316 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 316 may include one or more virtual storage resources (e.g., cloud storage, a virtual private network, and/or other virtual storage resources). Electronic storage 316 may store software algorithms, information determined by processor(s) 318, information received from computing platform(s) 302, information received from remote platform(s) 304, and/or other information that enables computing platform(s) 302 to function as described herein.

Processor(s) 318 may be configured to provide information processing capabilities in computing platform(s) 302. As such, processor(s) 318 may include one or more of a digital processor, an analog processor, a digital circuit designed to process information, an analog circuit designed to process information, a state machine, and/or other mechanisms for electronically processing information. Although processor(s) 318 is shown in FIG. 3 as a single entity, this is for illustrative purposes only. In some implementations, processor(s) 318 may include a plurality of processing units. These processing units may be physically located within the same device, or processor(s) 318 may represent processing functionality of a plurality of devices operating in coordination. Processor(s) 318 may be configured to execute modules 308, 310, and/or 312, and/or other modules. Processor(s) 318 may be configured to execute modules 308, 310, and/or 312, and/or other modules by software; hardware; firmware; some combination of software, hardware, and/or firmware; and/or other mechanisms for configuring processing capabilities on processor(s) 318. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 308, 310, 312, 320, 322, 326, 328, 330, and 334 are illustrated in FIG. 3 as being implemented within a single processing unit, in implementations in which processor(s) 318 includes multiple processing units, one or more of modules 308, 310, 312, 320, 322, 326, 328, 330, and 334 may be implemented remotely from the other modules. The description of the functionality provided by the different modules 308, 310, 312, 320, 322, 326, 328, 330, and 334 described below is for illustrative purposes, and is not intended to be limiting, as any of modules 308, 310, 312, 320, 322, 326, 328, 330, and 334 may provide more or less functionality than is described. For example, one or more of modules 308, 310, 312, 320, 322, 326, 328, 330, and 334 may be eliminated, and some or all of its functionality may be provided by other ones of modules 308, 310, 312, 320, 322, 326, 328, 330, and 334. As another example, processor(s) 318 may be configured to execute one or more additional modules that may perform some or all of the functionality attributed below to one of modules 308, 310, 312, 320, 322, 326, 328, 330, and 334.

FIGS. 4-13 illustrate methods 400, 500, 600, 700, 800, 900, 1000, 1100, 1200, and 1300 for data processing, in accordance with one or more implementations. The operations of method 400, 500, 600, 700, 800, 900, 1000, 1100, 1200, and 1300 presented below are intended to be illustrative. In some implementations, method 400, 500, 600, 700, 800, 900, 1000, 1100, 1200, and 1300 may be accomplished with one or more additional operations not described, and/or without one or more of the operations discussed. Additionally, the order in which the operations of method 400, 500, 600, 700, 800, 900, 1000, 1100, 1200, and 1300 are illustrated in FIGS. 4-13 and described below is not intended to be limiting.

In some implementations, methods 400, 500, 600, 700, 800, 900, 1000, 1100, 1200, and 1300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 400, 500, 600, 700, 800, 900, 1000, 1100, 1200, and 1300 in response to instructions stored electronically on an electronic storage medium such as a non-transient computer-readable storage medium. The one or more processing devices may include one or more devices configured through hardware, firmware, and/or software to be specifically designed for execution of one or more of the operations of method 400, 500, 600, 700, 800, 900, 1000, 1100, 1200, and 1300.

Figure 4:
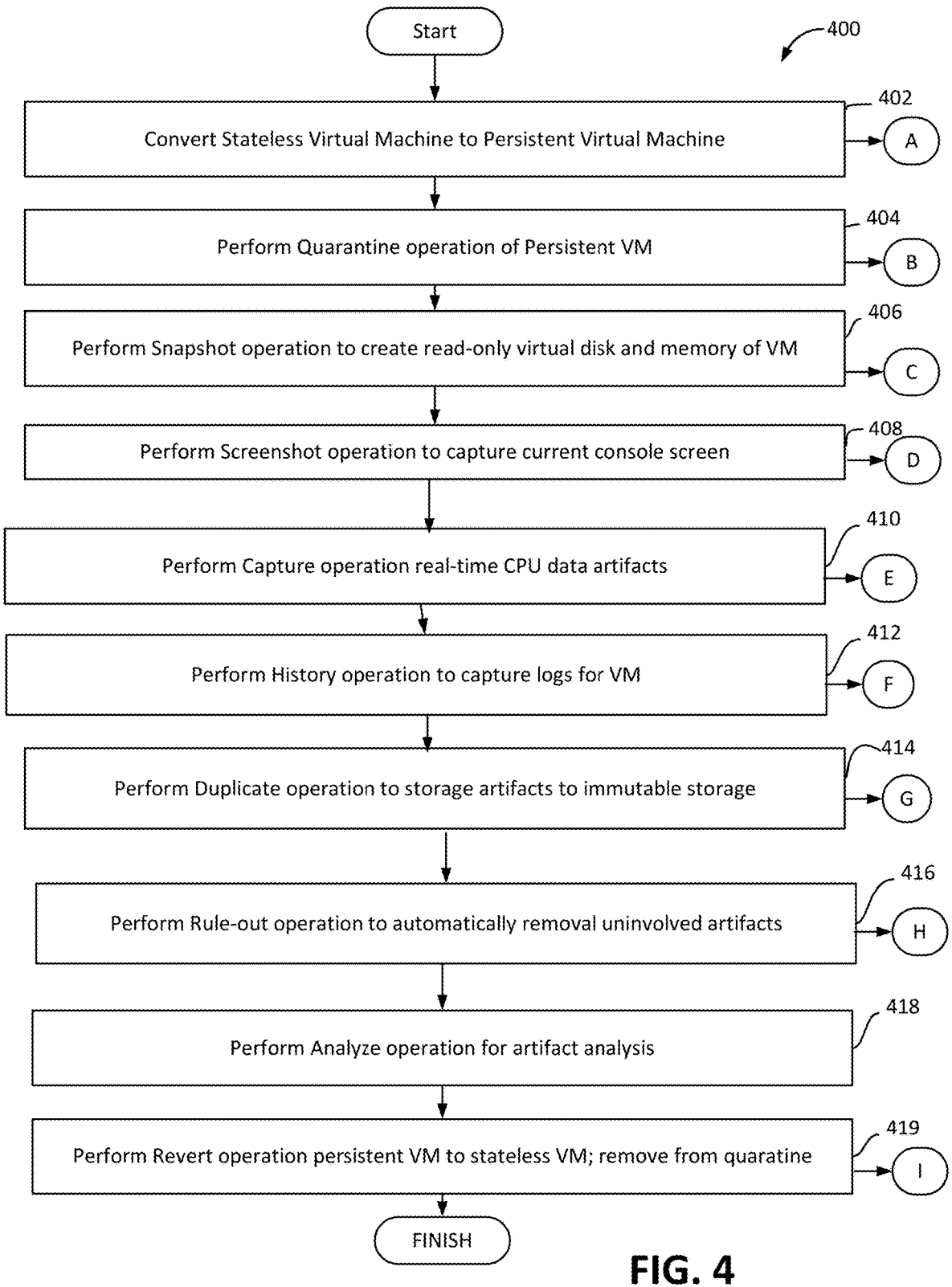
FIG. 4 illustrates a method for data collection in a virtualization environment, in accordance with one or more implementations.

FIG. 4 illustrates method 400, in accordance with one or more implementations. An operation 402 may include converting a stateless virtual machine VM 203 to a persistent virtual machine. Operation 402 may be performed by one or more hardware processors configured by machine-readable instructions for method of 500, including a module that is the same as or similar to module 308 in accordance with one or more implementations. An operation 404 may include electronically performing a quarantine operation of persistent VM. Operation 404 may be performed by one or more hardware processors configured by machine-readable instructions for method of 600, including a module that is the same as or similar to module 310, in accordance with one or more implementations.

An operation 406 may include electronically processing a snapshot operation to create read-only virtual disk and memory of the VM. Operation 406 may be performed by one or more hardware processors configured by machine-readable instructions for method of 700, including a module that is the same as or similar to module 312, in accordance with one or more implementations.

An operation 408 may include electronically processing a screenshot operation to capture current console screen. Operation 408 may be performed by one or more hardware processors configured by machine-readable instructions for method of 800, including a module that is the same as or similar to optimizer module 320, in accordance with one or more implementations.

An operation 410 may include electronically processing a capture operation of real-time CPU data artifacts. Operation 410 may be performed by one or more hardware processors configured by machine-readable instructions for method of 900, including a module that is the same as or similar to adaptive optimizer module 322 and machine learning module 308, in accordance with one or more implementations.

An operation 412 may include electronically processing a history operation to capture logs for VM. Operation 412 may be performed by one or more hardware processors configured by machine-readable instructions for method of 1000, including a module that is the same as or similar to adaptive optimizer module 326, in accordance with one or more implementations.

An operation 414 may include electronically processing a duplicate operation to storage artifacts to immutable storage. Operation 414 may be performed by one or more hardware processors configured by machine-readable instructions for method of 1100, including a module that is the same as or similar to module 328, in accordance with one or more implementations.

An operation 416 may include electronically perform a Rule-out operation to automatically removal uninvolved artifacts. Operation 416 may be performed by one or more hardware processors configured by machine-readable instructions for method of 1200, including a module that is the same as or similar to, module 330, in accordance with one or more implementations.

An operation 418 may include electronically perform an Analyze operation for artifact analysis. Operation 418 may be performed by one or more hardware processors configured by machine-readable instructions including a module that is the same as or similar to, module 332, in accordance with one or more implementations.

An operation 419 may include electronically perform a Revert operation persistent VM to stateless VM and remove from quarantine. Operation 419 may be performed by one or more hardware processors configured by machine-readable instructions for method of 1300, including a module that is the same as or similar to, module 334, in accordance with one or more implementations.

FIG. 5 illustrates method 500, in accordance with one or more implementations. An operation 502 may further include electronically processing, input parameters: virtual machine identifier or user name. An operation 504 may further include electronically processing a lookup Virtual Desktop session. An operation 506 may further include electronically processing to retrieve virtual machine identifier+metadata. An operation 508 may further include electronically processing if the retrieved target VM in stateless, proceeding to operation 510. Operation 510 may further include electronically processing to Disable Disk Removal of target VM on Logoff. In some implementations, conversion from stateless to persistent enable the data to saved and held for forensic data analysis. Operation 512 may further include electronically processing to pin user to virtual desktop within Horizon View. Operation 514 may further include electronically processing so that the stateless VM becomes a persistent VM transparent to the user.

FIG. 6 illustrates method 600, in accordance with one or more implementations. An operation 602 may further include electronically processing, quarantine port group on VDI within virtual environment. An operation 604 may further include electronically processing to receive input of Virtual Machine identifier. An operation 606 may further include electronically processing to connect to virtualization manager. To manage the virtual computing environment, the example virtual computing environment 200 includes an example virtualization manager, such as VMware vCenter. The example virtualization manager provides a single point of control to the virtual computing environment 200. In the illustrated example, the virtualization manager manages the assignments of virtual machines 203 and 205 to be virtualized on corresponding ones of the computing servers, and manages the assignments of resources of the computing servers to the virtual machines 203 and 205. An operation 608 may further include electronically processing if the VM not on Quarantine Port Group, then proceed to operation 610. In some implementations, operation 610 includes electronically processing, Reconnect VM to Quarantine Port Group/Logical Switch on the same storage device. In some implementations, operation 610 enables the data to be saved rather than be loss. An operation 612 may further include electronically processing to enable port mirroring on VM's port. An operation 614 may further include electronically processing to continual gathering of netflow and packets while limiting access.

FIG. 7 illustrates method 700, in accordance with one or more implementations that may be used to implement the processes and functions of certain embodiments. An operation 702 may further include electronically processing to receive input of Virtual Machine Identifier. An operation 704 may further include electronically processing to connect to the virtualization manager, such as VMware vCenter. An operation 706 may further include electronically processing to initiate VM Snapshot with Memory: periodic or ad-hoc operation. An operation 708 may further include electronically processing a snapshot created with memory such that a Virtual Disk no longer is written to and uses a snapshot file instead. An operation 710 may further include electronically processing Virtual Disk(s) Available for Collection a memory snapshot.

FIG. 8 illustrates method 800, in accordance with one or more implementations that may be used to implement the processes and functions of certain embodiments. An operation 802 may further include electronically processing to fault tolerance network packet capture on fault network. An operation 804 may further include electronically processing to input parameters Virtual Machine Identifer. An operation 806 may further include electronically processing to connect to virtualization manager. An operation 808 may further include electronically processing to determine if only have one vCPU, hot-add second vCPU (for example, modern OS types can hot-add vCPUs). In some implementations, the second vCPU may be configured to force full instructions to be passed over the network else when non-deterministic events are passed over the network. An operation 810 may further include electronically processing to initiate fault tolerance for the target virtual machine. An operation 812 may further include electronically processing to collect packets as fault tolerance sends data between nodes of the cluster via physical packet capture. An operation 814 may further include electronically processing to packets contain CPU Instructions for greater than two Core VMs.

FIG. 9 illustrates method 900, in accordance with one or more implementations that may be used to implement the processes and functions of certain embodiments. An operation 902 may further include electronically processing for log files output from hypervisor 319. An operation 904 may further include electronically processing to input parameters virtual machine identifier. An operation 906 may further include electronically processing to investigate log file(s). An operation 908 may further include electronically processing to discover all devices added or removed from virtual machine. An operation 910 may further include electronically processing to determine if Virtual Machine has changed file systems (Storage vMotion, Disk Clone, Disk Copy, Disk Move). An operation 912 may further include electronically processing to find available artifacts on older file system. An operation 914 may further include electronically processing to logs associated with target VM down to the virtual hardware added or removed.

FIG. 10 illustrates method 1000, in accordance with one or more implementations that may be used to implement the processes and functions of certain embodiments. An operation 1002 may further include electronically processing to an immutable storage API call. An operation 1004 may further include electronically processing to receive input parameters, such as virtual machine identifer. An operation 1006 may further include electronically processing to connect to a virtualization manager. An operation 1008 may further include electronically processing to download virtual machine disk, screenshots, snapshots, replicas, and metadata. An operation 1010 may further include electronically processing to duplicate artifacts to immutable storage, such as storage 324. An operation 1012 may further include electronically processing to copy of some or all artifacts on immutable storage.

FIG. 11 illustrates method 1100, in accordance with one or more implementations that may be used to implement the processes and functions of certain embodiments. An operation 1102 may further include electronically processing to employ an Artificial Intelligence or Machine Learning system. An operation 1104 may further include electronically processing to retrieve artifacts on immutable storage. An operation 1106 may further include electronically processing to determine if artifact(s) are unrelated to the data in the investigation file. An operation 1108 may further include electronically processing to remove artifact(s) from investigation file. An operation 1110 may further include electronically processing to maintain pertinent artifacts.

FIG. 12 illustrates method 1200, in accordance with one or more implementations that may be used to implement the processes and functions of certain embodiments. An operation 1202 may further include electronically processing to input phase parameters: virtual machine identifier stateless state. An operation 1204 may further include electronically processing to connect to virtualization manager. An operation 1206 may further include electronically processing to move from quarantine to production port group/logical switch. An operation 1208 may further include electronically processing to connect to Horizon View. An operation 1210 may further include electronically processing to determine if the target VM was a stateless virtual machine. If so, then the process proceeds to operation 121. An operation 1212 may further include electronically processing to revert to Stateless VM. An operation 1214 may further include electronically processing to unpin user from a virtual machine.

Figure 13:
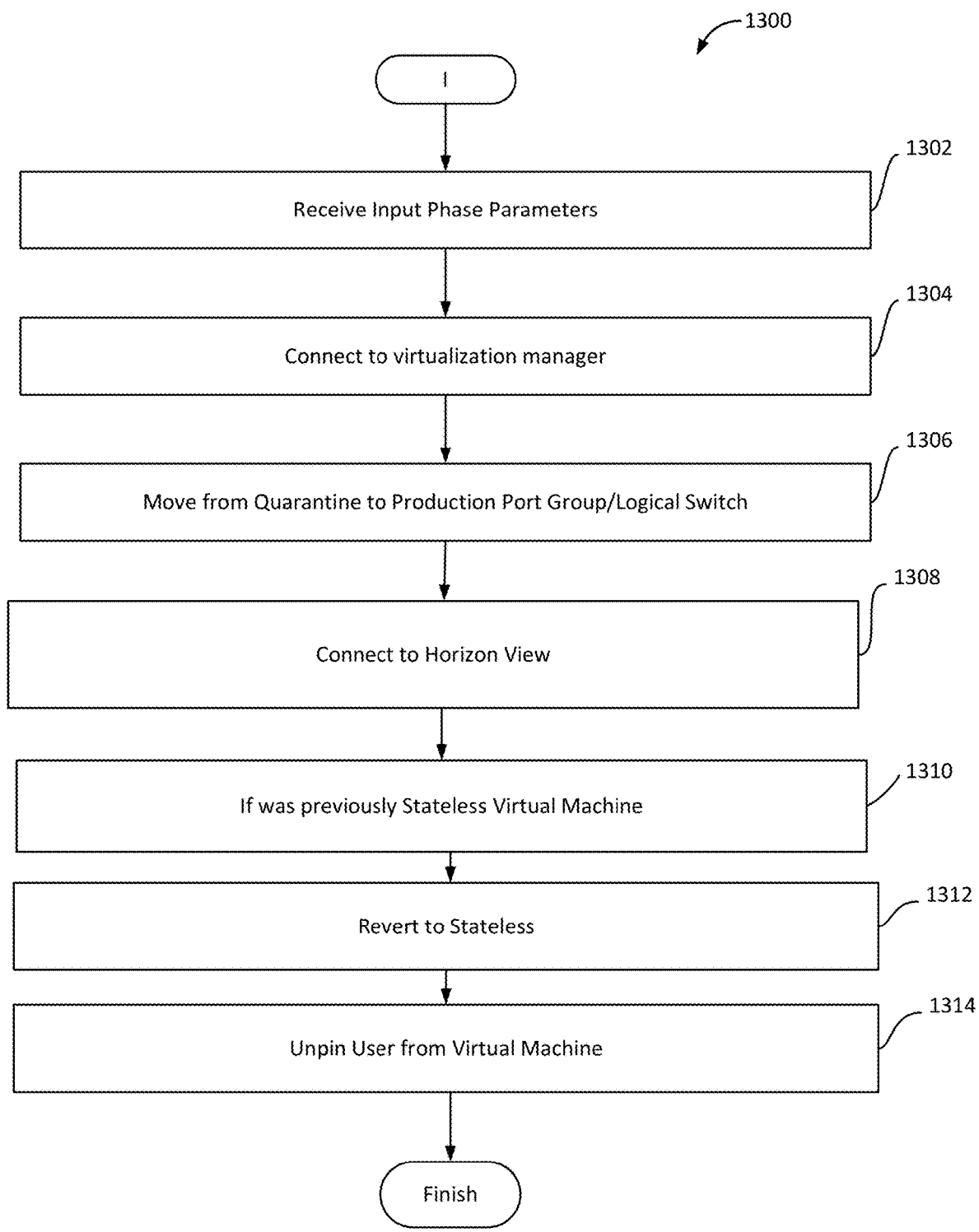
FIG. 13 illustrates a method for data collection in a virtualization environment, in accordance with one or more implementations.

FIG. 13 illustrates method 1300, in accordance with one or more implementations that may be used to implement the processes and functions of certain embodiments. An operation 1302 may further include electronically processing to, An operation 1304 may further include electronically processing to connect to virtualization manager, such as vCenter. An operation 1306 may further include electronically processing to move from quarantine to production port group/logical switch. An operation 1308 may further include electronically processing to connect to Horizon View. An operation 1310 may further include electronically processing to if was Stateless Virtual Machine. An operation 1312 may further include electronically processing to revert to a stateless VM. An operation 1314 may further include electronically processing to unpin user from virtual machine.

In some implementations, the hypervisor 319 could be extended to as virtualization manager for a cluster of virtual machines. For example, in an eight node cluster of VMs because of this automation and this process of automation of the present disclosure, the system 300 could collect data from part of the VM cluster, such as from one VM, one virtual switch, virtual versions of VMs, or the system could collect data resource pool of VM. The amount of data that can be collected would be based on the size of the digital data storage. The system 300 can collect data from the VMs at the same time using as many features that hypervisor 319 allows. In some implementations, the system 300 can operate based on name of the VM. In some implementations, the system 300 could operate based on hypervisor 319 on IP addresses of the VMs. In some implementations, the system 300 could operate based on any other types of metadata in the hypervisor 319.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A computer implemented method of data collection in a virtualization computing environment, comprising steps of:

electronically launching at least one virtual machine operatively connected to a virtualization layer;

electronically converting a stateless at least one virtual machine to a persistent at least one virtual machine;

electronically quarantining the at least one virtual machine into a quarantine network;

electronically capturing a plurality of digital memory attribute artifact data of a virtual disk of the persistent at least one virtual machine connected to the virtualization layer;

electronically capturing digital content associated with the persistent the at least one virtual machine so as to capture a plurality of console activity attribute artifact data;

electronically capturing digital packet data from a fault tolerant network so as to capture a plurality of CPU attribute artifact data; and electronically capturing the plurality of digital memory attribute artifact data, the plurality of console activity attribute artifact data, and the plurality of CPU attribute artifact data to an immutable storage;

electronically processing the plurality of digital memory attribute artifact data, the plurality of user activity attribute artifact data, and the plurality of CPU attribute artifact data with a deep machine learning appliance using neutral networks so as to output a forensic dynamic attribute data set for the persistent at least one virtual machine; determining at least one forensic dynamic attribute data set to remove from the forensic dynamic attribute data set and electronically reverting to the stateless at least one virtual machine.

2. The method of claim 1, further comprising electronically capturing a plurality of digital log attribute artifact data from the persistent the at least one virtual machine connected to the virtualization layer.

3. The method of claim 1, further comprising electronically capturing a plurality of digital log attribute artifact data based on a threshold period of time from the persistent at least one virtual machine connected to the virtualization layer.

4. A system configured for data collection in a virtualization environment, the system comprising:

one or more hardware processors configured by machine-readable instructions to: electronically launch at least one virtual machine operatively connected to a virtualization layer;

electronically convert a stateless at least one virtual machine to a persistent at least one virtual machine and quarantine the at least one virtual machine into a network;

electronically capture a plurality of digital memory attribute artifact data of a virtual disk of the persistent at least one virtual machine connected to the virtualization layer;

electronically capture digital content associated with the persistent the at least one virtual machine so as to capture a plurality of console activity attribute artifact data;

electronically capture the digital packet data from a fault tolerant network so as to capture a plurality of CPU attribute artifact data; and electronically capture the plurality of digital memory attribute artifact data, the plurality of console activity attribute artifact data, and the plurality of CPU attribute artifact data into an immutable storage;

electronically processing the plurality of digital memory attribute artifact data, the plurality of user activity attribute artifact data, and the plurality of CPU attribute artifact data with a deep machine learning appliance using neutral networks so as to output a forensic dynamic attribute data set for the persistent at least one virtual machine; determining at least one forensic dynamic attribute data set to remove from the forensic dynamic attribute data set and electronically reverting to the stateless at least one virtual machine.

5. The system of claim 4, wherein the one or more hardware processors are further configured by machine-readable instructions to electronically capture a plurality of digital log attribute artifact data from the persistent at least one virtual machine connected to the virtualization layer.

6. The system of claim 4, wherein the one or more hardware processors are further configured by machine-readable instructions to electronically capture a plurality of digital log attribute artifact data based on a threshold period of time from the persistent at least one virtual machine connected to the virtualization layer.

7. A computing platform configured for data collection in a virtualization environment, the computing platform comprising:

a non-transient computer-readable storage medium having executable instructions embodied thereon; and one or more hardware processors configured to execute the instructions to:

electronically launch at least one virtual machine operatively connected to a virtualization layer;

electronically convert a stateless at least one virtual machine to a persistent at least one virtual machine and quarantine the at least one virtual machine into a network;

electronically capture a plurality of digital memory attribute artifact data of a virtual disk of the persistent at least one virtual machine connected to the virtualization layer;

electronically capture digital content associated with the persistent the at least one virtual machine so as to capture a plurality of console activity attribute artifact data;

electronically capture the digital packet data from a fault tolerant network so as to capture a plurality of CPU attribute artifact data; and electronically capture the plurality of digital memory attribute artifact data, the plurality of console activity attribute artifact data, and the plurality of CPU attribute artifact data into an immutable storage;

electronically processing the plurality of digital memory attribute artifact data, the plurality of user activity attribute artifact data, and the plurality of CPU attribute artifact data with a deep machine learning appliance using neutral networks so as to output a forensic dynamic attribute data set for the persistent at least one virtual machine; determining at least one forensic dynamic attribute data set to remove from the forensic dynamic attribute data set and electronically reverting to the stateless at least one virtual machine.

8. The computing platform of claim 7, wherein the one or more hardware processors are further configured by machine-readable instructions to electronically capture a plurality of digital log attribute artifact data from the persistent at least one virtual machine connected to the virtualization layer.

9. The computing platform of claim 7, wherein the one or more hardware processors are further configured by machine-readable instructions to electronically capture a plurality of digital log attribute artifact data based on a threshold period of time from the persistent at least one virtual machine connected to the virtualization layer.

* * * * *